(12) United States Patent
Fukaya et al.

(10) Patent No.: US 9,701,553 B2
(45) Date of Patent: Jul. 11, 2017

(54) COPPER RECOVERY APPARATUS

(71) Applicant: Kabushiki Kaisha Toshiba, Minato-ku, Tokyo (JP)

(72) Inventors: Taro Fukaya, Higashikurume (JP); Kenji Tsutsumi, Yokohama (JP); Atsushi Yamazaki, Tokyo (JP); Ichiro Yamanashi, Tokyo (JP); Hirofumi Noguchi, Sakai (JP); Yasutaka Kikuchi, Tokyo (JP); Shuji Seki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 14/297,227

(22) Filed: Jun. 5, 2014

(65) Prior Publication Data
US 2014/0284256 A1   Sep. 25, 2014

Related U.S. Application Data

(62) Division of application No. 13/491,399, filed on Jun. 7, 2012, now Pat. No. 8,986,541.

(30) Foreign Application Priority Data

Jun. 8, 2011   (JP) ................... 2011-128632

(51) Int. Cl.
  *C02F 1/00*   (2006.01)
  *C02F 1/48*   (2006.01)
  (Continued)

(52) U.S. Cl.
  CPC ............ *C02F 1/5281* (2013.01); *C02F 1/001* (2013.01); *C02F 1/488* (2013.01); *C02F 1/5245* (2013.01);
  (Continued)

(58) Field of Classification Search
  CPC ...... C02F 1/5821; C02F 1/5245; C02F 1/001; C02F 1/488; C02F 2201/48; C02F 2209/06; C02F 2101/20; Y10S 210/912
  See application file for complete search history.

(56) References Cited

U.S. PATENT DOCUMENTS 4,299,541 A   11/1981   Ohara et al.
5,900,146 A   5/1999    Ballard et al.
(Continued)

FOREIGN PATENT DOCUMENTS

CN   1375507 A   10/2002
CN   1748832 A   3/2006
(Continued)

OTHER PUBLICATIONS

Search Report mailed by Singapore Patent Office on Apr. 11, 2013 in Singapore Patent Application No. 201204199-2 in 15 pages.
(Continued)

*Primary Examiner* — David A Reifsnyder
(74) *Attorney, Agent, or Firm* — Knobbe, Martens, Olson & Bear, LLP

(57) ABSTRACT

According to one embodiment, a copper recovery apparatus includes a precipitation tank, a mixing tank, a filter-aid feeder, a solid-liquid separator includes a filter, a cleaning-water supply line, a cleaning-water discharge line, a separation tank, and a filter-aid return line. The precipitation tank is configured to receive copper ions-containing water to be treated and an alkali to prepare treated water containing a precipitate of copper compound. The solid-liquid separator is configured to allow the treated water to be passed through the filter on which the precoat layer is deposited to separate the precipitate retained on the precoat layer from a filtrate.

7 Claims, 5 Drawing Sheets

(51) Int. Cl.
*C02F 1/52* (2006.01)
*C02F 1/20* (2006.01)
*C02F 101/20* (2006.01)

(52) U.S. Cl.
CPC ...... *C02F 2101/20* (2013.01); *C02F 2201/48* (2013.01); *C02F 2209/06* (2013.01); *Y10S 210/912* (2013.01)

(56) References Cited

U.S. PATENT DOCUMENTS

| | | | |
|---|---|---|---|
| 7,739,745 | B2 | 6/2010 | Ishimatsu et al. |
| 8,221,622 | B2 | 7/2012 | Fukaya et al. |
| 8,354,022 | B2 | 1/2013 | Fukaya et al. |
| 8,512,570 | B2 | 8/2013 | Fukaya et al. |
| 8,540,883 | B2 | 9/2013 | Fukaya et al. |
| 2001/0042688 | A1 | 11/2001 | Nabekura et al. |
| 2005/0009002 | A1 | 1/2005 | Chen |
| 2005/0258103 | A1 | 11/2005 | Cort |
| 2006/0090082 | A1 | 4/2006 | Apostolopoulos |
| 2006/0146604 | A1 | 7/2006 | Muraki et al. |
| 2006/0194535 | A1 | 8/2006 | Houldsworth et al. |
| 2007/0009232 | A1 | 1/2007 | Muraki et al. |
| 2008/0288136 | A1 | 11/2008 | Itatsu |
| 2009/0277843 | A1 | 11/2009 | Fukaya et al. |
| 2010/0326898 | A1 | 12/2010 | Scholz et al. |
| 2012/0234767 | A1 | 9/2012 | Fukaya |
| 2012/0234768 | A1 | 9/2012 | Fukaya et al. |
| 2012/0238003 | A1 | 9/2012 | Fukaya |
| 2012/0288435 | A1 | 11/2012 | Fukaya |
| 2012/0312727 | A1 | 12/2012 | Fukaya et al. |
| 2013/0055407 | A1 | 2/2013 | Hirayama et al. |

FOREIGN PATENT DOCUMENTS

| | | |
|---|---|---|
| CN | 101229504 A | 7/2008 |
| CN | 201587966 U | 9/2010 |
| EP | 1 189 432 A2 | 3/2002 |
| JP | 52-129063 A | 10/1977 |
| JP | 55-029012 A | 3/1980 |
| JP | H01-107890 A | 4/1989 |
| JP | 06-114382 A | 4/1994 |
| JP | H07-047371 A | 2/1995 |
| JP | 09-327611 A | 12/1997 |
| JP | H10-085761 A | 4/1998 |
| JP | 2000-167569 A | 6/2000 |
| JP | 2002-239559 A | 8/2002 |
| JP | 2003-235001 A | 8/2003 |
| JP | 2003-346000 A | 12/2003 |
| JP | 2004-097952 A | 4/2004 |
| JP | 2004-249251 A | 9/2004 |
| JP | 2005-252435 A | 9/2005 |
| JP | 2005-254158 A | 9/2005 |
| JP | 2005-296837 A | 10/2005 |
| JP | 2005-324137 A | 11/2005 |
| JP | 2006-108961 A | 4/2006 |
| JP | 2006-122817 A | 5/2006 |
| JP | 2006-159042 A | 6/2006 |
| JP | 2007-083179 A | 4/2007 |
| JP | 2007-275757 A | 10/2007 |
| JP | 2009-268976 | 11/2009 |
| JP | 2009-268976 A | 11/2009 |
| JP | 2010-069363 A | 4/2010 |
| JP | 2010-207680 A | 4/2010 |
| JP | 2010-110688 A | 5/2010 |
| JP | 2010-137147 A | 6/2010 |
| JP | 2010-207755 A | 9/2010 |
| JP | 2011-046787 A | 3/2011 |
| JP | 2012-187083 A | 10/2012 |

OTHER PUBLICATIONS

First Office Action mailed by Japan Patent Office on May 14, 2013 in Japanese patent application No. 2011-128632.
Notification of the First Office Action issued by State Intellectual Property Office (SIPO) of the People's Republic of China on Aug. 5, 2013 in the corresponding Chinese patent application No. 201210188712.1.
Toshiba, Background Art Information, Undated.
Background Art Information issued by Toshiba on Jun. 8, 2012—1 page.
Background Art Information issued by Toshiba in U.S. Appl. No. 13/194,115—2 pages.
European Search Report Dated Jun. 24, 2013 in the corresponding European Patent Application No. 12178817.8 for U.S. Appl. No. 13/609,648—8 pages.
First Office Action mailed Oct. 16, 2012 in the corresponding Japanese Patent Application 2012-010319 —9 pages.
First Office Action mailed by Japan Patent Office on Apr. 2, 2013 corresponding to Japanese Patent Application No. 2011-105209 in 6 pages.
First Office Action mailed by Japan Patent Office on Jan. 6, 2015 in the corresponding Japanese Application No. 2011-198711 for U.S. Appl. No. 13/194,115—7 pages.
Notification of the First Office Action issued by State Intellectual Property Office (SIPO) of the People's Republic of China on Aug. 30, 2013 in the corresponding Chinese Patent Application No. 201210143355.7—19 pages.
Notification of the First Office Action mailed by Intellectual Property Agency, People's Republic of China on Office Action Jan. 6, 2014 in Chinese Application No. 201110259626.0—18 pages.
"Protected User Mode Audio (PUMA)", Nov. 10, 2011 http://web.archive.org/web/20111110135613/http://msdn.microsoft.com/en-us/library/windows/desktop.dd756608%28v=US.85%29.as.px[retrievedon Jun. 12, 2013].
Search Report and Written Opinion issued by Hungarian Intellectual Property Office on Jul. 4, 2013 in the corresponding Hungarian Patent Application No. 201203420-3 for U.S. Appl. No. 13/467,826—15 pages.
Sing et al. "Removal of Fluoride from Spent Pot Linger Leachate Using Ion Exchange," Water Environment Research, vol. 71, No. 1, pp. 36-42.
Xu Jinlan et al., "Lime precipitation-coagulation precipitation treating fluoride-containing wastewater test," Technology of Water Treatment, vol. 29, No. 5, pp. 282-285.

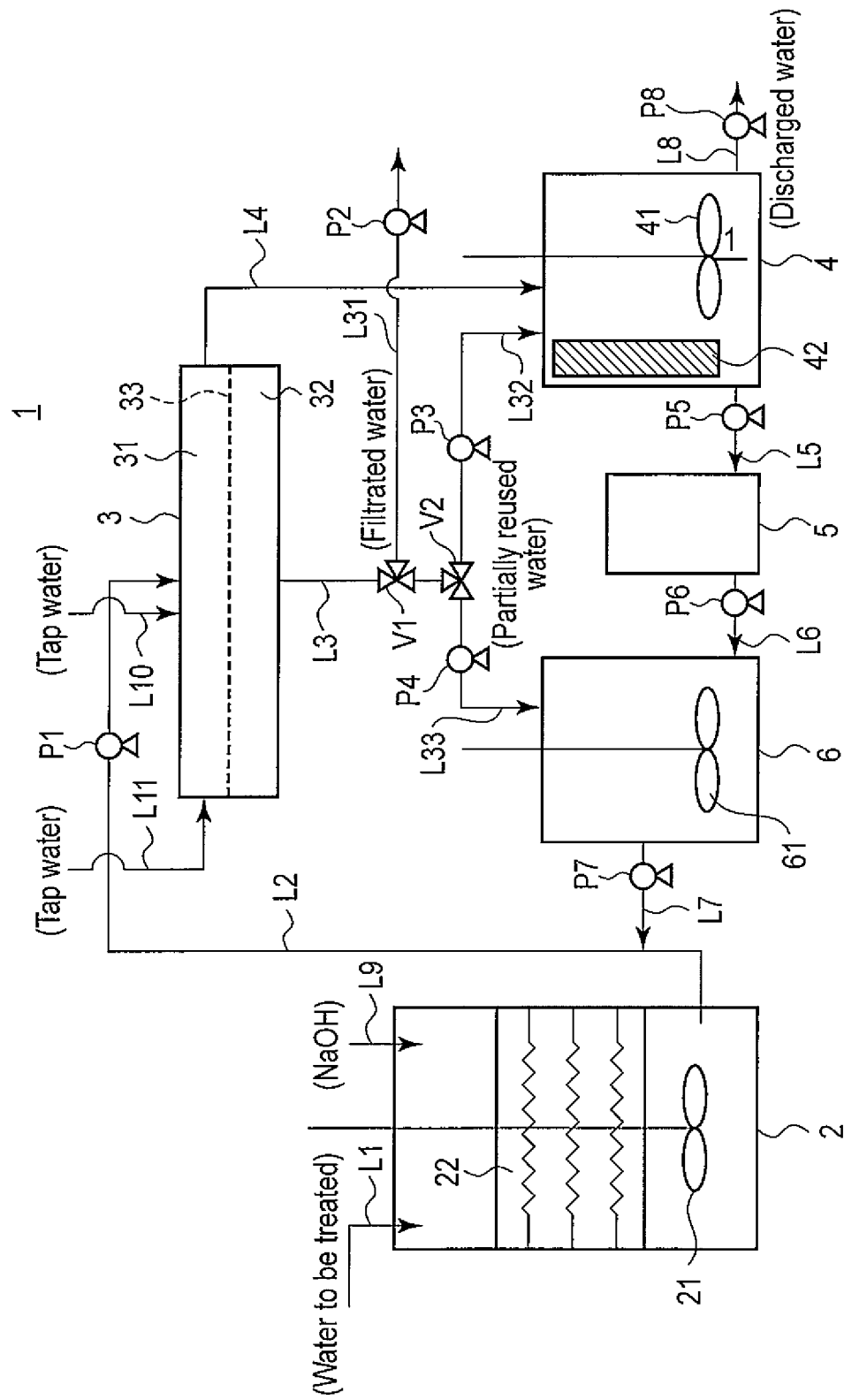
F I G. 1

COPPER RECOVERY APPARATUS

CROSS-REFERENCE TO RELATED APPLICATIONS

This application is a divisional of U.S. patent application Ser. No. 13/491,399 filed on Jun. 7, 2012, which issued as U.S. Pat. No. 8,986,541 and which is based upon and claims the benefit of priority from prior Japanese Patent Application No. 2011-128632, filed Jun. 8, 2011, the entire contents of each of which are incorporated herein by reference.

FIELD

Embodiments described herein relate generally to a copper recovery system which is configured to recover copper present in water.

BACKGROUND

Effective use of water resources has recently been in demand due to industrial developments and population growth. In order to meet the demand, reuse of wastewater such as industrial wastewater is important. In order to reuse such wastewater, water purification, i.e. separation of other substances from the water, is necessary. As a method for separating other substances from the water, various methods such as membrane separation, centrifugal separation, activated carbon adsorption, ozone treatment, and floating substance removal by aggregation have been known. The methods are capable of removing substances which are contained in water and can exert considerable influence on environment, such as phosphorus and nitrogen, and removing oil and clays dispersed into the water.

Among the methods, the membrane separation is one of the methods which are most generally employed for removing insoluble substances in water, and a filter aid is used in the membrane separation from the viewpoints of membrane protection and an increase in flow rate of water which contains hardly-dewaterable substances.

Meanwhile, as a method for removing harmful substances and valuable substances from water, a method including causing a predetermined reaction of a substance dissolved in water so that the substance is precipitated as a precipitate and separating the precipitate from the water has been known. For example, there has been known a method including precipitating copper ions in water, aggregating precipitated copper particles by adding a polymer having aggregation function in order to prevent discharge of the precipitated fine copper particles to other systems, and separating and recovering copper as aggregates.

However, since the aggregates per se include a large amount of the polymer in the above-mentioned method, the method has a problem of low copper recovery efficiency and low copper purity per unit volume of the aggregates. Further, a problem of a large waste amount is detected with the method since a large amount of sludge which should finally be disposed remains after the separation of copper from the aggregates.

A copper recovery apparatus which is capable of: reducing a waste amount, realizing fine copper particles precipitated in water directly to solid-liquid separation, and enhancing copper recovery efficiency is in need.

BRIEF DESCRIPTION OF THE DRAWINGS

FIG. 1 is a block diagram showing a configuration of a copper recovery apparatus according to a first embodiment;

DETAILED DESCRIPTION

Figure 2:
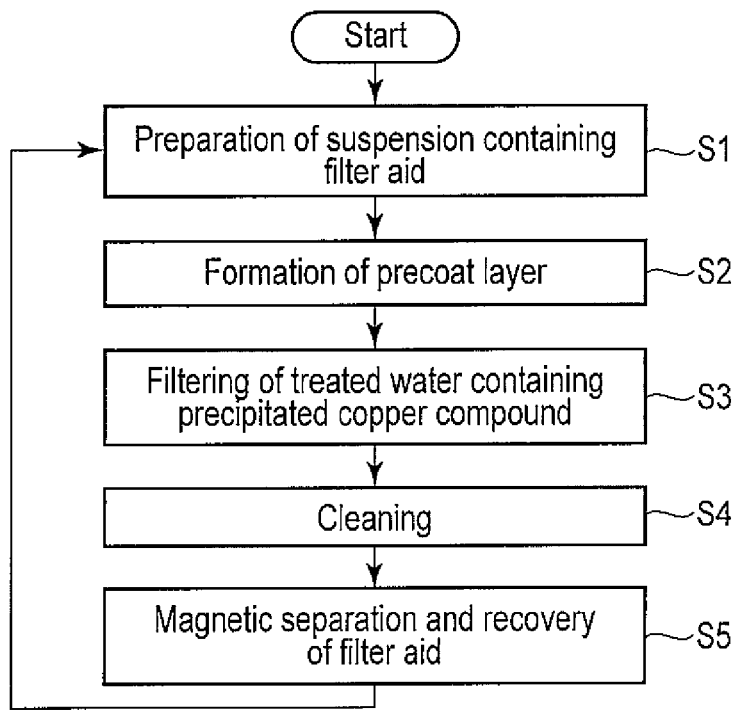
FIG. 2 is a flowchart showing a copper recovery method by a precoating process in which the apparatus of FIG. 1 is used.

In general, according to one embodiment, a copper recovery apparatus includes a precipitation tank, a mixing tank, a filter-aid feeder, a solid-liquid separator comprising a filter, a cleaning-water supply line, a cleaning-water discharge line, a separation tank, and a filter-aid return line. The precipitation tank is configured to receive copper ions-containing water to be treated and add an alkali to the water to be treated to prepare treated water containing a precipitate of copper compound. The mixing tank configured to mix a filter aid containing magnetic particles having an average particle diameter of 0.5 to 20 μm with a dispersion medium to prepare a suspension. The filter-aid feeder configured to supply the filter aid to the mixing tank. The solid-liquid separator is configured to receive the suspension from the mixing tank so that a precoat layer of the filter aid is deposited on the filter, and then, receive the treated water from the precipitation tank so as to allow the treated water to be passed through the filter on which the precoat layer is deposited to separate the precipitate retained on the precoat layer from a filtrate. The cleaning-water supply line is configured to supply water to the filter on which the precoat layer having the precipitate retained thereon is deposited and to remove the precipitate and the filter aid from the filter. The cleaning-water discharge line is configured to discharge from the solid-liquid separator the precipitate and the filter aid together with the water supplied by the cleaning water supply line to the filter. The separation tank is configured to receive the precipitate, the filter aid and the water discharged from the solid-liquid separator and separate the filter aid from the precipitate and the water by utilizing a magnetic field. The filter-aid return line is configured to return the filter aid separated in the separation tank to the filter-aid feeder.

The inventors had conducted extensive researches by performing various experiments on direct solid-liquid separation of a copper precipitate in wastewater by using a filtration membrane to find that it is difficult to directly filter out the copper precipitate precipitated from wastewater since a particle diameter of the copper precipitate (initial diameter) is too small. Various embodiments based on the findings will be described below.

(1) A copper recovery apparatus according to the present embodiment comprises: a precipitation tank 2 configured to add an alkali to copper ions-containing water to be treated and to precipitate a precipitate containing a copper compound; a heating mechanism 22 configured to heat the precipitate in the precipitation tank to form at least a part of the copper compound in the precipitate into copper oxide; a filter aid feeder 5 which supplies a filter aid of which an average diameter of particles or aggregates containing a magnetic substance is 0.5 to 20 µm; a mixing tank 6 configured to mix the filter aid with a dispersion medium to prepare a suspension; a solid-liquid separator 3 comprising a filter 33 which filtrates the filter aid from the suspension upon supply of the suspension from the mixing tank to form a precoat layer comprising the filter aid and filtrates the copper compound containing the copper oxide from the treated water upon supply of the treated water from the precipitation tank so that the copper compound is captured by the precoat layer; a treated water supply line L2 configured to supply the treated water to the solid-liquid separator from the precipitation tank; a mixing line L7 connected to the treated water supply line, which is configured to mix the suspension from the mixing tank with the treated water from the treated water supply line; a cleaning line L11 configured to supply cleaning water to the filter so that the precoat layer is cleaned from the filter; a separation tank 4 which separates the copper compound from the filter aid, the copper compound and the filter aid being contained in cleaning effluent discharged together with the cleaning water from the solid-liquid separator; a cleaning effluent line L32 which sends the cleaning effluent from the solid-liquid separator to the separation tank; and a filter aid return line L5 which returns the filter aid separated in the separation tank to the filter-aid feeder (FIG. 1).

The present embodiment comprises: precipitating copper oxide as the copper compound by alkalizing the water to be treated in the precipitation tank; mixing with the dispersion medium the filter aid of which the average diameter of the particles or the aggregates containing the magnetic substance is 0.5 to 20 µm; supplying the mixture from the mixing tank to the solid-liquid separator via the treated water supply line to form a deposit layer of the filter aid on the filter; supplying the treated water from the precipitation tank to the solid-liquid separator via the treated water supply line so that the copper oxide is captured when the treated water is passed through the filter aid layer; supplying the cleaning water to the solid-liquid separator device via the cleaning line to clean the copper oxide together with the filter aid from the filter; supplying the cleaning effluent from the solid-liquid separator to the separation tank via the cleaning effluent line; and separating and recovering the copper oxide from the filter aid which is cleaned in the separation tank and returning the separated and recovered filter aid from the separation tank to the filter feeder via the filter aid return line while recovering the separated and recovered copper oxide. Thereby, the present embodiment enables to reuse the separated and recovered filter aid in the filter aid feeder and attaining high recovery efficiency by directly separating the precipitated copper particles having a very small particle diameter (FIG. 1). As used herein, "copper oxide" includes a double salt and a mixed salt each containing copper oxide. Examples of such copper oxide include a combination of copper carbonate and copper oxide, a combination of copper sulfate and copper oxide, and the like.

Figure 4:
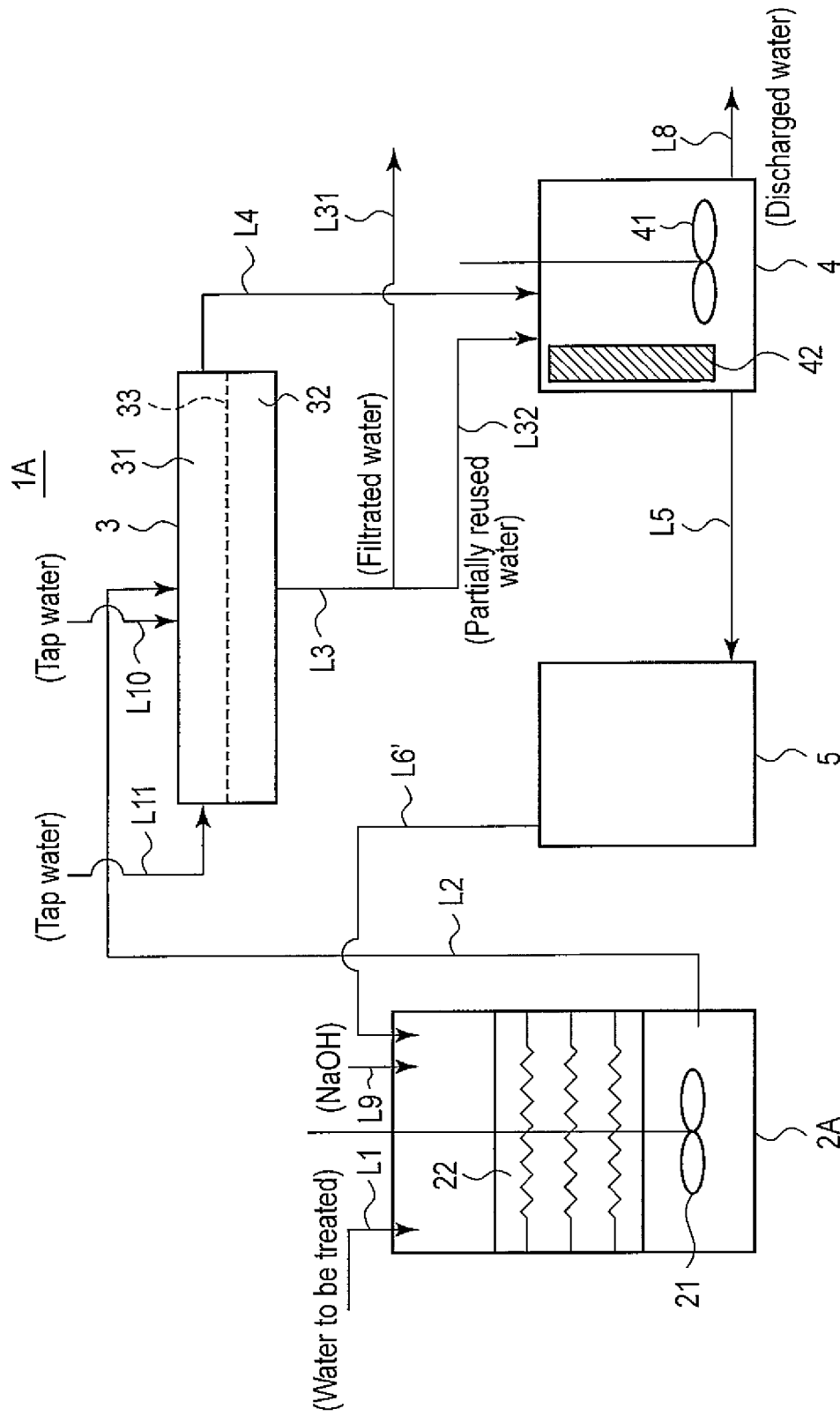
FIG. 4 is a block diagram showing a configuration of a copper recovery apparatus according to a second embodiment.

(2) The copper recovery apparatus according to the present embodiment comprises: a mixing and precipitation tank 2A which prepares a suspension by mixing a filter aid of which an average diameter of particles or aggregates containing a magnetic substance is 0.5 to 20 µm with water to be treated and alkalizing water to be treated so that a copper compound is precipitated; a heating mechanism 22 which heats the copper compound in the mixing an precipitation tank to form at least a part of the copper compound into copper oxide; a filter aid feeder 5 which supplies the filter aid to the mixing and precipitation tank; a solid-liquid separator 3 comprising a filter 33 which filtrates the precipitated copper compound and the filter aid from the suspension upon supply of the suspension from the mixing and precipitating tank to form a deposit layer comprising the precipitated copper compound containing the copper oxide and the filter aid; a treated water supply line L2 which supplies the treated water from the mixing and precipitation tank to the solid-liquid separator; a cleaning line L11 which supplies cleaning water to the filter so that the deposit layer is cleaned from the filter; a separation tank 4 which separates the precipitated copper compound from the filter aid, the copper compound and the filter aid being contained in cleaning effluent discharged together with the cleaning water from the solid-liquid separator; a cleaning effluent line L32 which sends the cleaning effluent from the solid-liquid separator to the separation tank; and a filter aid return line L5 which returns the filter aid separated in the separation tank to the filter aid feeder (FIG. 4).

The apparatus according to the present embodiment is used for a so-called body-feed filtration (FIG. 5), of which the mixing and precipitation tank has two functions which are the precipitation function and the mixing function.

According to the present embodiment: the copper compound is precipitated in the mixing and precipitation tank; the precipitated copper compound is mixed with the filter aid to form a suspension; the suspension is sent to the solid-liquid separator; and the solid-liquid separation of the copper compound is performed while forming the membrane of the filter aid on the filter.

(3) Preferably, in the apparatus of (1) or (2): the filter aid comprises an aggregate obtainable by aggregating magnetic particles having surface coated with a polymer; an average particle diameter D1 of the magnetic particles is within a range of 0.5 to 20 µm; the average particle diameter D1 of the magnetic particle and an average aggregate diameter D2 of the aggregates satisfy the following relationship: D1<D2≤20 µm; and an average coating thickness t of the polymer ranges 0.01≤t≤0.25 µm (FIG. 3).

In the present embodiment, the average particle diameter D1 of the magnetic particles may preferably be within the range of 0.5 to 20 µm, and a more preferred range of the diameter D1 is 0.5 to 15 µm. When the average particle diameter D1 of the magnetic particles is less than 0.5 µm, the particles are densely aggregated to make a distance between particles too small, thereby making it difficult to attain an effective treated water passing rate. On the other hand, when the average particle diameter D1 exceeds 20 µm, the particles are coarsely aggregated to make the distance between particles too long and to allow fine precipitates in water to readily pass therethrough, thereby largely deteriorating efficiency of recovering the precipitated copper compound. When the average particle diameter D1 is less than 15 µm, the recovery efficiency of the copper compound particles is further improved. By the way, the inventors found that it is difficult to attain the effective copper recovery efficiency in the case where the average particle diameter D1 of the magnetic particles is 26 µm, for example. Such findings suggest that the copper recovery efficiency is deteriorated when the average particle diameter D1 of the magnetic particles is excessively large.

In the present embodiment, the average particle diameter D1 and the average aggregate diameter D2 of the aggregates of the magnetic particles may preferably satisfy the following relationship: D1<D2≤20 µm, more preferably D1<D2≤15 µm. When the average aggregate diameter D2 of the aggregates exceeds 20 µm, the fine precipitates in water are allowed to readily pass through as described above, thereby largely deteriorating the copper recovery efficiency. When the average particle diameter D2 is 15 μm, the copper recovery efficiency is further improved as described above.

In the present embodiment, the average coating thickness t of the polymer may preferably range 0.01≤t≤0.25 μm, more preferably 0.01≤t≤0.15 μm. When the average coating thickness t of the polymer is less than 0.01 μm, the desired coating effect is not attained, and the aggregate is deteriorated in strength to be unusable. On the other hand, when the coating thickness t exceeds 0.25 μm, clearances between the magnetic particles in the aggregate are filled with a resin to reduce not only the water passing rate of the treated water but also roughness, and, therefore, a copper compound particle capture rate tends to be lowered. Further, when the coating thickness t is 0.15 μm or less, appropriate roughness is attained to enhance capture performance of capturing the copper compound particles and to increase the treated water passing rate, thereby further improving the copper recovery efficiency.

Figure 6:
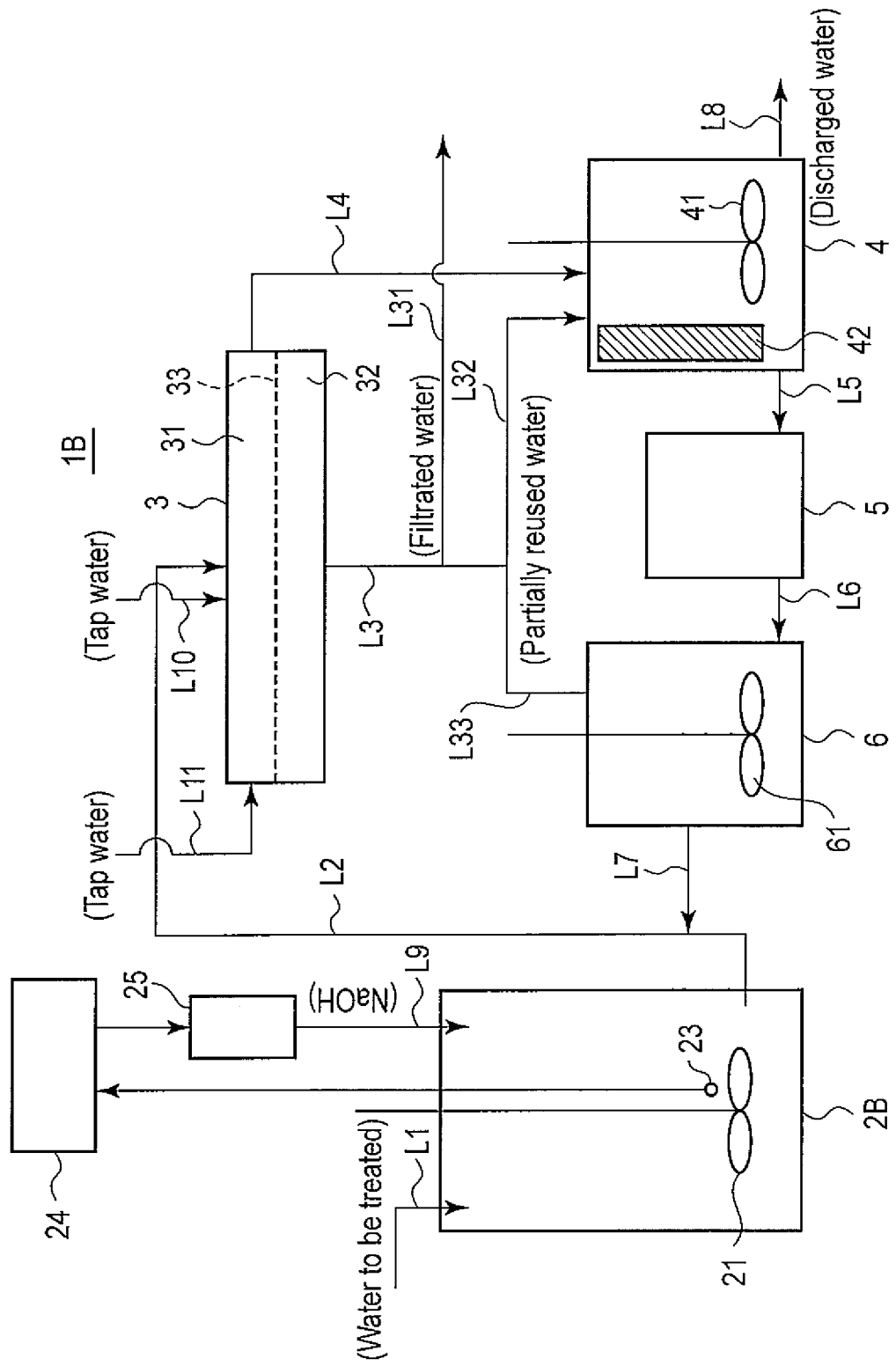
FIG. 6 is a block diagram showing a configuration of a copper recovery apparatus according to a third embodiment.

(4) The copper recovery apparatus according to the present embodiment comprises: a precipitation tank 2B which receives copper ions-containing water to be treated, an alkali feeder which adds an alkali to the water to be treated contained in the precipitation tank to precipitate a copper compound; a filter aid feeder 5 which supplies a filter aid of which an average particle diameter of particles or aggregates containing a magnetic substance is 0.5 to 20 μm; a mixing tank 6 which mixes the filter aid supplied from the filter aid feeder with a dispersion medium to prepare a suspension; a solid-liquid separator 3 comprising a filter 33 which filtrates the filter aid from the suspension upon supply of the suspension from the mixing tank to form a precoat layer formed of the filter aid and filtrates the copper compound containing the copper oxide from the treated water so that the copper compound is captured by the precoat layer; a treated water supply line L2 which supplies the treated water from the precipitation tank to the solid-liquid separator; a mixing line L7 which is connected to the treated water supply line to mix the suspension from the mixing tank with the treated water of the treated water supply line; a cleaning line L11 which supplies the filter with cleaning water in order to clean the precoat layer from the filter; a separation tank 4 which separates the copper compound from the filter aid, the copper compound and the filter aid being contained in cleaning effluent discharged together with the cleaning water from the solid-liquid separator; a cleaning effluent line L32 which sends the cleaning effluent from the solid-liquid separator to the separation tank; a filter aid return line L5 which returns the filter aid which is separated in the separation tank to the filter aid feeder; a unit 23 which measures a pH value of the treated water in the precipitation tank; a pH control mechanism 24 which stops the addition of the alkali from the alkali feeder based on the detected pH value measured by the pH measurement unit to stop a reaction when the pH value of the treated water in the precipitation tank is within the neutral range or adjusts the alkali addition from the alkali feeder based on the detected pH value measured by the pH measurement unit, so as to allow the reaction to continuously proceed in a state where the pH value of the treated water in the precipitation tank is maintained within the neutral range (FIG. 6).

In each of a copper oxide generation reaction and a copper hydrooxide generation reaction, a precipitate which is obtained by the reaction within acidic range is dissolved due to the reaction with an acid, and, as a result, a precipitate of copper is not obtained. The copper compound emerges as a precipitate in an aqueous solution when a pH value is close to the neutral range. In the case of giving priority to the copper oxide generation reaction rather than to the copper hydroxide generation reaction, it is better to keep the pH value close to the neutral range. More specifically, in the neutral range, the copper hydroxide generation reaction does not proceed due to the limited number of hydroxide groups, while the copper oxide generation reaction proceeds well due to the presence of hydrogen peroxide.

In the present embodiment, in the pH control mechanism 24, the addition of alkali to the treated water is stopped based on the detected pH value to stop the reaction when the pH value of the treated water in the precipitation tank is within the neutral range, or the addition of alkali to the treated water is adjusted based on the detected pH value, so as to allow the reaction to continuously proceed in the state where the pH value of the treated water in the precipitation tank is maintained within the neutral range. Therefore, the pH value of the treated water is maintained within the neutral range to allow the copper oxide generation reaction to proceed well as compared to the copper hydroxide generation reaction, thereby attaining the precipitation of a large amount of copper oxide particles. As used herein, the "neutral range" substantially means a range of pH 5 to 9.

Note that, insofar as the ultimate pH value which is attained when the reaction terminates is maintained within the neutral range, acidic treated water and a liquid alkali (e.g. sodium hydroxide solution) may be separately added to a liquid which is adjusted to the neutral range in advance of the addition to allow a continuous reaction, without limitation to the above-described method of adding alkali to the treated water.

(5) The copper recovery apparatus of the present embodiment comprises: a mixing and precipitation tank 2A which mixes a filter aid of which an average diameter of particles or aggregates containing a magnetic substance is 0.5 to 20 μm with water to be treated and alkalizes the treated water to precipitate a copper compound so as to prepare a suspension; a heating mechanism 22 which heat the copper compound in the mixing and precipitation tank to convert at least a part of the copper compound into copper oxide; a filter aid feeder 5 which supplies the filter aid to the mixing and precipitation tank; a solid-liquid separator 3 comprising a filter 33 which filtrates the precipitated copper compound and the filter aid from the suspension upon supply of the suspension from the mixing and precipitating tank to form a deposit layer comprising the precipitated copper compound containing the copper oxide and the filter aid; a treated water supply line L2 which supplies the treated water from the mixing and precipitation tank to the solid-liquid separator; a cleaning line L11 which supplies cleaning water to the filter so that the deposit layer is cleaned from the filter; a separation tank 4 which separates the precipitated copper compound from the filter aid, the copper compound and the filter aid being contained in cleaning effluent discharged together with the cleaning water from the solid-liquid separator; a cleaning effluent line L32 which sends the cleaning effluent from the solid-liquid separator to the separation tank; a filter aid return line L5 which returns the filter aid separated in the separation tank to the filter-aid feeder; a unit 23 which measures a pH value of the treated water in the precipitation tank; and a pH control mechanism 24 which stops the addition of the alkali from the alkali feeder based on the detected pH value measured by the pH measurement unit to stop a reaction so that the pH value of the treated water in the precipitation tank is within the neutral range or adjusts the alkali addition from the alkali feeder based on the detected pH value measured by the pH measurement unit, so as to allow the reaction to continuously proceed in a state where the pH value of the treated water in the precipitation tank is maintained within the neutral range.

The apparatus according to the present embodiment is used for a so-called body-feed filtration (FIG. 5), of which the mixing and precipitation tank has two functions which are the precipitation function and the mixing function. In the present embodiment, the effects same as those of (2) are attained.

(6) Preferably, in the apparatus of (4) or (5): the filter aid comprises an aggregate obtainable by aggregating magnetic particles of which each of surfaces is coated with a polymer; an average particle diameter D1 of the magnetic particles is within a range of 0.5 to 20 μm; the average particle diameter D1 of the magnetic particles and an average aggregate diameter D2 of the aggregates satisfies the following relationship: D1<D2≤20 μm; and an average coating thickness t of the polymer ranges 0.01≤t≤0.25 μm (FIG. 3). In the present embodiment, the effects same as those of (3) are attained.

Hereinafter, the embodiments and examples will be described with reference to the accompanying drawings.

In the embodiments or examples described below, copper oxide is precipitated by directly adding an alkali solution to water be treated containing copper ions such as a copper sulfate solution. As the type of the alkali, sodium hydroxide is most suitably used without particular limitation thereto. The direct addition of alkali solution causes a particle diameter of precipitated copper particles to be reduced, thereby making it quite difficult to separate the copper particles from water. However, since the method of any one of the embodiments described below enables to efficiently separate the fine copper compound particles (average particle diameter: 0.01 to 10 μm), the number of process steps is reduced, and the apparatus is readily simplified.

Two types of methods of using a filter aid, namely, a precoating process and body-feed filtration, may be employed for copper recovery. The apparatuses used for the methods are different from each other in configuration, and the apparatuses are described below one by one.

First Embodiment

A copper recovery apparatus of the first embodiment will be described with reference to FIG. 1.
(First Copper Recovery Apparatus)

A copper recovery apparatus 1 of the present embodiment is used for a precoating process and, particularly, is effectively used in the case where a concentration of a copper compound precipitated in treated water is low. The copper recovery apparatus 1 includes a precipitation tank 2, a solid-liquid separator 3, a separation tank 4, a filter aid tank 5, and a mixing tank 6, as well as a water-to-be-treated supply source, a alkali feeder, and a effluent storage tank which are not shown. The units and devices are connected to one another by piping lines L1 to L8. The piping lines L1 to L8 are provided with various pumps P1 to P8 and a valve 1, as well as a measurement device and a sensor which are not shown. Detection signals is sent from the measurement device and the sensor to an input port of a controller (not shown), and control signals are sent from an output port of the controller to the pumps P1 to P8 as well as to the valve V1 and a valve V2, so that the operations of the pumps and valves are controlled. Thus, the overall copper recovery apparatus 1 is comprehensively controlled by the controller.

The precipitation tank 2 has a stirring screw 21 which stirs the treated water. Industrial wastewater containing copper ion s is introduced from the water-to-be-treated supply source (not shown) into the precipitation tank via the line L1, and the industrial wastewater is temporarily stored as the water to be treated. During that time, an appropriate amount of sodium hydroxide (NaOH) is added to the precipitation tank 2 from the alkali feeder (not shown), so that the copper ion contained in the treated water is precipitated as copper compounds.

Further, the precipitation tank 2 has a drum heater 22. Power supply to the drum heater 22 is controlled by a controller (not shown), so that a temperature of the precipitation tank 2 is controlled to 60° C. The drum heater 22 is used for heating the treated water to change copper hydroxide of the copper compounds contained in the treated water into copper oxide by oxidization.

The solid-liquid separator 3 incorporates a filter 33 which partitions an internal space of the separator 3 into an upper introduction space 31 and a lower discharge space 32. As the filter 33, those obtained by weaving a polymer fiber such as polyester, nylon, polypropylene, a fluorine fiber, and cellulose acetate by plain weaving, twilling, double weaving, or the like are usable. A filter thickness is substantially 1 mm or less, and a filter mesh size is substantially about 1 to 20 μm.

The introduction space 31 of the solid-liquid separator is connected to the precipitation tank 2 via the treated water supply line L2 having the pressure pump P1. Further, a tap water supply line L10 and L11 which are two lines for supplying tap water to the introduction space 31 is connected to the introduction space 31. The tap water supply line L10 is connected to an upper part of the introduction space 31 of the solid-liquid separator 3 and removes the ion components in the copper compound contained in the deposit layer on the filter 33 by supplying the tap water to the introduction space 31. The ion components (Na ions, Ca ions, Mg ions, etc.) contained in the deposit layer are effectively removed by introducing an abundant amount of the tap water into the introduction space of the solid-liquid separator via the tap water supply line L10.

Further, a cleaning line L11 for supplying the tap water from a city water pipe and a cleaning effluent line L4 are connected to lateral parts of the introduction space 31, respectively. The cleaning line L11 is used for supplying the tap water from the lateral direction into the introduction space 31 so as to flake and remove the deposit layer from the filter 33. The tap water which is in a satisfactory amount and at a satisfactory pressure is introduced from the lateral direction into the introduction space 31 of the solid-liquid separator 3 via the cleaning line L11, so that the deposit layer is flaked off and removed from the filter 33 by the water pressure. In this case, when a jet nozzle is provided at a connection between the cleaning line L11 and the solid-liquid separator 3 in such a manner that the water is jetted out from the nozzle, the deposit-layer-flaking effect is much enhanced to further improve the removal efficiency.

The discharge space 32 of the solid-liquid separator is connected to the treated water distribution line L3 having the two three-way valves V1 and V2. A treated water line L31 is branched from the treated water distribution line L3 at the first three-way valve V1 having the pump P2. Two lines L32 and L33 are branched off from the treated water distribution line L3 at the second three-way valve V2. One of the branch lines L32 has the pump P3 and is connected to the separation tank 4 described below. The other branch line L33 has the pump P4 and is connected to the mixing tank 6 described below.

The separation tank 4 has a stirring screw 41 which stirs cleaning effluent received from the introduction space 31 of the solid-liquid separator through the cleaning effluent line L4, and incorporates an electromagnet 42 which is used for the separation of the precipitated copper compounds from the filter aid. The electromagnet 42 is connected to a power source (not shown) of which on-off is controlled by a controller (not shown).

The branch line L32 which is branched off from the treated water distribution line L3 is connected to an upper part of the separation tank 4 in addition to the cleaning effluent line L4, and a part of the filtrated water passed through the filter 33 of the solid-liquid separator is supplied to the separation tank 4 to be reused in the separation tank 4. The effluent line L8 and the filter aid return line L5 are connected to a lower part of the separation tank 4. The effluent line L8 has the pump P8 and serves as a piping for discharging the effluent from the separation tank 4 to the storage tank (not shown). The filter aid return line L5 has the pump P5 and serves as a piping for returning the separated filter aid from the separation tank 4 to the filter aid tank 5.

The filter aid tank 5 has such a configuration that a new filter aid is supplied from a filter aid source (not shown), and that the filter aid separated in the separation tank 4 is returned thereto through the above-described filter aid return line L5. Further, the filter aid tank 5 is configured to supply an appropriate amount of the filter aid to the mixing tank 6 via the filter aid supply line L6 having the pump P6.

The mixing tank 6 has a stirring screw 61 which stirs a mixture of the filter aid and a dispersion medium, and is configured to prepare a mixture (suspension) containing the filter aid by adding the dispersion medium to the filter aid supplied from the filter aid tank 5 and stirring and mixing them. As the dispersion medium, water may preferably be used. The branch line L33 branched off from the treated water distribution line L3 is connected to an upper part of the mixing tank 6, and a part of the filtrated water passed through the filter 33 of the solid-liquid separator is supplied to the mixing tank 6 to be reused as the dispersion medium in the mixing tank 6.

Further, the filter aid supply line L7 having the pump P7 is communicated with the mixing tank 6 in place. The filter aid supply line L7 is connected to and joins the treated water supply line L2 in place, so that the mixture (suspension) from the mixing line L7, which contains the filter aid, is added to the treated water flowing through the treated water supply line L2. The mixing line L7 is provided with a flow rate control valve (not shown), so that a flow rate of the mixture (suspension) containing the filter aid is adjusted by the controller.

(Precoating Process)

Hereinafter, the precoating process using the above-described apparatus 1 will be described with reference to FIG. 1 and FIG. 2.

To start with, a magnetic substance-containing filter aid and a dispersion medium are mixed in the mixing tank 6 to prepare a suspension containing the filter aid (Step S1). The filter aid contains magnetic particles and may further contain a polymer coating the magnetic particles. Water is mainly used as the dispersion medium, and other dispersion mediums may be used as required. A filter aid concentration in the suspension is adjusted to about 10000 to 200000 mg/L, for example, though it is not particularly limited insofar as a precoat layer, i.e. a filter aid deposit layer, is formed by the following operation.

Next, the suspension is passed through the filter 33 of the solid-liquid separator 3, so that the filter aid in the suspension is filtrated to be remained on the filter, thereby forming a deposited particle layer (precoat layer) formed of the filter aid (Step S2). The suspension is passed through the filter 33 by the pressure pump P1 at a predetermined pressure. Since the precoat layer is formed and retained by the external force as described above, the above-described filtering is performed in such a manner that, for example, the filter is disposed so as to cover an opening of a predetermined container, so that the filter aid remains, is aligned, and is layered on the filter 33 thus disposed. In this case, the precoat layer is formed and retained by the external force from a wall surface of the container and a downward external force (gravity) due to a weight of the filter aid positioned above. A thickness of the precoat layer is subject to change depending on the concentration of the liquid to be treated and is substantially about 0.5 to 10 mm.

In the precipitation tank 2, sodium hydroxide as the alkali is added to the copper-containing water to be treated to precipitate a copper compound containing copper hydroxide as a main component. The precipitated copper compound is heated to lead the oxidization of a part of the copper hydroxide, resulting in the formation of copper oxide. A reaction temperature and a reaction period may be those which cause at least a part of the copper hydroxide to change into copper oxide and may preferably be within the ranges of 60° C. to 80° C. and 1 to 30 minutes. As a heating unit, a resistance heating element such as the drum heater 22 or the like provided on an outer periphery of the precipitation tank 2 may be used. The heating of the treated water may be performed while adding the alkali agent or may be performed by supplying the treated water through a piping of which a temperature is adjusted, such as a heat exchanger.

Next, the treated liquid contained the precipitated copper is supplied to the solid-liquid separator 3 under a pressure, and solid-liquid separation (filtering) is performed by using the precoat layer which is formed in advance of the filtering (Step S3). The supply is usually performed under pressure. Here, the copper compound (mainly copper oxide) is removed by adsorption by the precoat layer, more specifically by a surface of the filter aid forming the precoat layer. Here, the filter aid having a special structure described later in this specification traps the insoluble matter and allows a satisfactory water passing rate. The filtrate is weakly alkaline treated water from which copper is removed and may be discharged through a neutralization tank or may be used as cleaning water for the magnet in the separation tank of the solid-liquid separator 3 or a liquid for preparing a filter aid slurry in the mixing tank 6.

After the removal of the copper compound in water, the precoat layer is dispersed into a dispersion medium to disintegrate the precoat layer into the filter aid and to clean the filter aid (Step S4). The cleaning may be performed in the container in which the filter is set or may be performed in another container. In the case of using another container, the precoat layer is disintegrated into the filter aid by cleaning or like processing and then is transferred. Water is used for the cleaning, and a surfactant or an organic solvent may be used for the cleaning.

Next, the filter aid after the cleaning is recovered by magnetic separation (Step S5). A method for the magnetic separation is not particularly limited, and examples thereof include a recovery method in which a permanent magnet or an electromagnet is put in the container containing particles to be recovered, a method of recovering the particles in which a metal mesh which is magnetized by a magnet is used to capture the particles and then the magnetic field is released so that the particle are recovered, and the like. More specifically, the filter aid is captured by using the electromagnet, and then the cleaning liquid is discharged from an outlet of the cleaning container. Alternatively, the filter aid is captured by using the electromagnet and then transferred to another container for recovery.

After termination of the filtering of the treated water, there is a cake of the filter aid and the precipitated copper compound formed on the filter 33 of the solid-liquid separator 3. In order to remove ion components present in the cake, tap water is supplied from an upper line L10 of the solid-liquid separator 3. Thus, the ions attached to the copper compound existing in the cake. After the ion removal, in order to recover the cake on the filter 33 of the solid-liquid separator, tap water is supplied from a lateral line L11 so that the cake is crumbled and is separated from the filter 33, and then the cleaning effluent containing the filter aid and the copper compound are supplied to the separation tank 4. The separation tank 4 is provided with the string screw 41 and the electromagnet 42 (magnetic separation mechanism). The cleaning effluent is stirred in the separation tank 4 with the stirring screw 41 to satisfactorily disperse the filter aid and the copper compound into water. Then, the electromagnet 42 is turned on to so that the filter aid is captured by the electromagnet 42. Thus, the filter aid is separated and recovered from the water. The water from which the filter aid has been recovered is discharged water containing the copper compound at high concentration, and, by virtue of the operation of the pump P8, the discharged water is sent to a device (not shown) for a post treatment via the recovery line L8. The copper is recovered from the discharged water by the post-treatment device. In the present embodiment, a total amount of wastes generated by the copper recovery process is small since added substances such as the filter aid and the polymer coagulant are not contained in the discharged water.

After the discharged water is discharged from the separation tank 4, the electromagnet 42 is turned off to allow the filter aid to fall off from the electromagnet 42, and then the cleaning water is introduced into the separation tank 4 to clean the filter aid. The filter aid after the cleaning with the cleaning water is returned to the filter aid tank 5 through the return line L5 by virtue of the operation of the pump P5. The returned filter aid is supplied again to the mixing tank 6 to be reused.

In the present embodiment, since the precoat layer is formed in advance of passing through the treated water, the amount of the copper compound adsorbed on the surface of the filter aid is increased along with an increase in treatment period. As a result, clearances of the filter aid can be filled with the excessively adsorbed copper compound, and the water passing rate can be reduced. Therefore, the method of the first embodiment is effective in the case where the concentration of the copper compound in water is low as described above.

(Filter Aid)

Hereinafter, the filter aid will be described in detail.

Figure 3A:
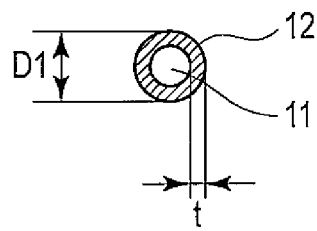
FIG. 3A is a sectional view schematically showing a magnetic particle coated with a polymer.
Figure 3B:
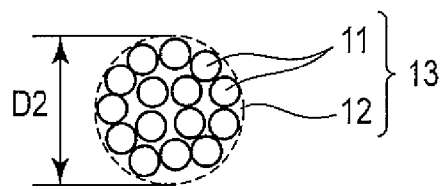
FIG. 3B is a sectional view showing an aggregate obtainable by aggregating magnetic particles.

The filter aid to be used contains magnetic particles, and the magnetic particles have an average particle diameter within the range of 0.5 to 20 μm. The filter aid may be particles of a magnetic substance or may be the magnetic particles 11 of which each of surfaces is coated with a coating agent 12 such as a polymer as shown in FIG. 3A. Alternatively, the filter aid may be aggregates 13 in each of which the magnetic particles 11 each coated with a polymer are aggregated as shown in FIG. 3B.

More preferably: the average particle diameter D1 of the magnetic substance of the filter aid is 0.5 to 20 μm; a part of the magnetic substance is aggregated by a polymer or trialkoxysilane; an average aggregate diameter D2 thereof, with the D1, satisfies the relationship D1<D2≤20 μm; and a surface coating thickness t of the polymer is within the range of 0.01≤t≤0.25 μm. As used herein, "average particle diameter" means the one measured by laser diffraction. More specifically, the average particle diameter is measured by using SALD-DS21 Type Measurement Apparatus (trade name) manufactured by Shimadzu Corporation, for example. When the average particle diameter of the magnetic substance as primary particles exceeds 20 μm, a distance between the particles can be long to allow fine precipitates in water described later in this specification to readily pass through. On the other hand, when the primary particle diameter is less than 0.5 μm, the particles are densely aggregated to make it difficult to attain the effective treated water passing rate though fine precipitates in water are removed.

For example, ferromagnetic substances in general are usable as the magnetic substance, and examples thereof include iron, an alloy containing iron, magnetite, ilmenite, pyrrhotite, magnesia ferrite, cobalt ferrite, nickel ferrite, balium ferrite, and the like. Among these, the ferrite compound which is excellent in stability in water is more effective. For example, magnetite ($Fe_3O_4$) is not only inexpensive, but also is stable as a magnetic substance in water and safe as an element. Therefore, magnetite is preferred since it is readily used for water treatments. Further, the magnetic substance may be in various shapes such as a spherical shape, a polyhedral shape, and the like, or be in amorphous, and are not particularly limited. The preferred particle diameter and shape of the magnetic substance which is suitably used may appropriately be selected in view of a production cost and the like, and the spherical shape or a polyhedral structure of which corners are rounded is preferred. The magnetic substance may be plated by an ordinary plating process such as Cu plating and Ni plating as required.

Further, the aggregate in which each of surfaces of the magnetic particles is coated with a polymer has such a structure that the primary particles having a core/shell structure in which the polymer layer coating the surfaces serves as the shell are aggregated.

In the present embodiment, a material suitably used as the polymer which coats the surfaces of the magnetic particles and aggregates the particles may be selected depending on the purpose. Preferably, polyacrylonitrile, polymethylmethacrylate and polystyrene which are easily coated on the magnetic substance and has acid/alkali resistance, copolymers thereof, a phenol resin excellent in dispersion in water, or a trialkoxysilane condensate which has high stability in water by firmly adhering to the magnetic substance may be used. The polymer may preferably be coated in such a manner that the average surface coating thickness t of the polymer is 0.01≤t≤0.25 μm. When the coating thickness t is less than 0.01 μm, strength of a secondary aggregate is reduced to make the use in water difficult in some cases. When the coating thickness t is more than 0.25 μm, clearances between particles are narrowed to make it difficult to ensure the effective water passing rate when used as the filter aid in some cases. Calculation of a polymer coating amount may be carried out by observation using an optical microscope or scanning electron microscope (SEM), while the average thickness of the polymer layer is accurately obtained by heating the filter aid under an oxygen-free situation to lead the thermal decomposition thereof, and then detecting an amount of weight loss, i.e. a polymer coating amount, and calculating the polymer layer average thickness from specific surface areas of the particles.

In the case where the magnetic substance comprises the aggregate in which each of the particles each coated with the polymer are aggregated, the aggregate may preferably have a characteristic shape. More specifically, in the filter aid of the present embodiment, the average aggregate diameter D2 of the aggregates satisfies the relationship D1<D2≤20 μm when the average particle diameter of the magnetic substance is D1. When the aggregates have such a size, the particles are not aggregated in the form of a sphere but are in the form of a baroque shape. Owing to the baroque shape, appropriate clearances are guaranteed during the filtering and deposition when the aggregate is used as the filter aid or a precoat material, thereby attaining a filtering flow rate while entrapping the copper compound in the treated water. When the average aggregate diameter D2 of the aggregates 13 is too large, i.e. exceeds 20 μm, clearance between the aggregates is increased to sometimes make it difficult to entrap the copper precipitate in water. Further, the average aggregate diameter may more preferably be such that D1<D2≤15 μm. When the average aggregate diameter D2 is 15 μm or less, the copper precipitate in water is more efficiently entrapped.

The filter aid to be used in the present embodiment may be produced by an arbitrary production process insofar as the process realizes the above-described filter aid structure. As one of examples of the method, a spray drying process in which: a polymer is dissolved into an organic solvent capable of dissolving the polymer; a composition obtainable by dispersing the magnetic substance into the solution is prepared; and the organic solvent is removed by spraying the composition is considered. With the process, the average particle diameter of the secondary aggregates which are the aggregates of the primary particles is adjusted by adjusting an ambient temperature, a spraying speed, and the like of the spray drying, and, further, pores are formed between the aggregated primary particles when the organic solvent is removed, thereby easily forming a suitable porous structure.

On the other hand, as an industrial method for forming the filter aid, a polymer solution in which a polymer is dissolved into an organic solvent capable of dissolving the polymer is prepared, and the polymer solution is casted on a surface of the magnetic substance placed in a mold or the like. Then, the organic solvent is removed from the polymer solution, followed by solidification, and the solidified matter is milled. Alternatively, the organic solvent is removed from a composition in which the magnetic substance is dispersed into the polymer solution, followed by solidification, and the solidified matter is milled. Further, it is possible to produce the filter aid by adding a composition obtained by dissolving a polymer into a solvent to a Henschel mixer, a ball mill, a granulator, or the like by dropping, followed by drying. Here, the preferred filter aid is produced by performing two steps, i.e. the step under the production conditions for covering surfaces of the magnetic substance and the step under the conditions for aggregating the magnetic substance.

Hereinafter, a method for adjusting the polymer coating thickness and a method for adjusting the aggregate diameter of the aggregates obtained by aggregation of the polymer-coated magnetic particles during the production will be described.

The surface coating thickness on the surface of the magnetic substance is decided based on calculation using a mixing ratio between the polymer and the magnetic substance, density of the resin, and a specific surface area of the magnetic substance. More specifically, a volume of the resin to be added is detected from a weight and density of the resin, and the volume is divided by a surface area of the magnetic substance which is detected from a weight and the specific surface area of the magnetic substance, thereby obtaining the average coating thickness t of the polymer. Control of the particle diameter is varied depending on the type of the sprayed liquid and the spraying method, and a diameter of a droplet to be spray-dried is reduced in order to downsize the aggregate. For example, the particle diameter of the aggregates to be produced is reduced by increasing the spraying pressure of the spray nozzle, reducing a spraying speed, or increasing a rotation speed of a spray disk.

Hereinafter, a method for measuring the polymer coating thickness in a ready-made aggregate will be described.

Calculation of the polymer coating thickness may be carried out by observation using an optical microscope or SEM, while preferably the polymer coating thickness of the polymer layer is accurately obtained by heating it under an oxygen-free situation to lead the thermal composition of the resin, and then, detecting an amount of weight loss, i.e. a polymer coating weight, and calculating the polymer layer average thickness from specific surface areas of the particles.

Second Embodiment

A copper recovery apparatus 1A of the second embodiment will be described with reference to FIG. 4. A part of features of the present embodiment which overlaps with the features of the foregoing embodiment is not repeated.
(Second Copper Recovery Apparatus)

A copper recovery apparatus 1A of the present embodiment is used for body-feed filtration, which, particularly, is effectively used in the case where a copper compound concentration in water is high. The feature by which the copper recovery apparatus 1A of the present embodiment is different from the apparatus 1 of the first embodiment is that the apparatus 1A is not provided with any mixing tank 6, and a mixing and precipitation tank 2A is provided in place of the precipitation tank 2 of the first embodiment. The mixing and precipitation tank 2A has both of a precipitation function of adding an alkali to water to be treated and precipitating a copper compound and a mixing function of adding a filter aid to the treated water and mixing the filter aid with the treated water. More specifically, in the copper recovery apparatus 1A of the present embodiment, the filter aid is directly supplied from a filter aid tank 5 to the mixing and precipitation tank 2A via a direct supply line L6' without flowing through the mixing tank described in the foregoing.
(Body-Feed Filtration)

Figure 5:
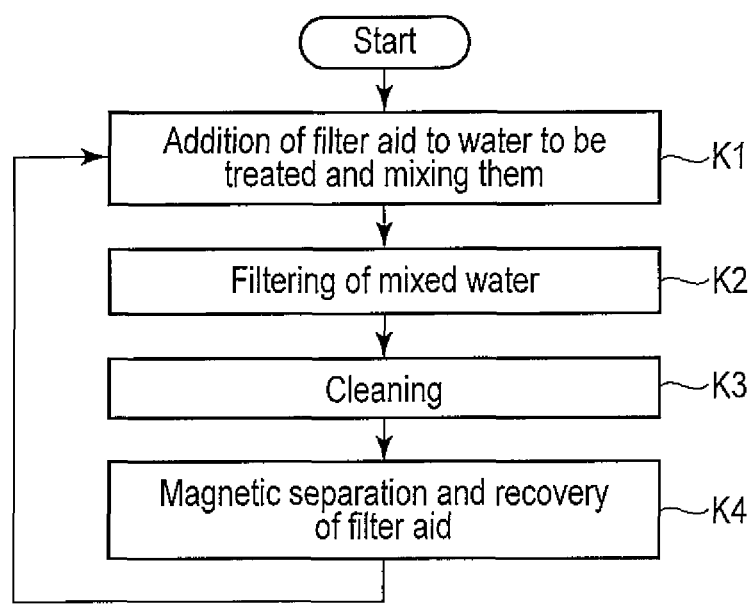
FIG. 5 is a flowchart showing a copper recovery method by body-feed filtration in which the apparatus of FIG. 2 is used.

Hereinafter, the body feed filtration using the apparatus 1A will be described with reference to FIG. 4 and FIG. 5.

In the present embodiment, too, a filter aid and a dispersion medium are mixed together to prepare a suspension The dispersion medium used in this case is treated water existing in the mixing and precipitation tank 2A. More specifically, the filter aid is directly put in the treated water to prepare the suspension (Step K1). A filter aid concentration in the suspension is not particularly limited insofar as a filter layer is formed by the following operation and may be adjusted to about 10000 to 200000 mg/L.

A copper compound containing copper oxide is precipitated by adjusting a pH value at which a reaction between the suspension and an alkali is allowed. The present method is effective in the case where an oxidizer such as hydrogen peroxide is previously contained in the treated water containing copper.

Next, the suspension (treated water) is passed through a filter to filter out the filter aid in the suspension, so that the filter aid is remained on the filter, thereby forming a filter layer formed by aggregation of the filter aid (Step K2). The water is passed under a pressure.

Since the filter layer is formed and retained by an external force as described in the foregoing, the above-described filtering is performed in such a manner that, for example, the filter is disposed so as to cover an opening of a predetermined container, so that the filter aid remains, is aligned, and is layered on the filter thus disposed. In this case, the filter layer is formed and retained by the external force from a wall surface of the container and the downward external force (gravity) due to a weight of the filter aid positioned above.

After the removal of the copper compound in the treated water as described above, the filter layer is dispersed into the dispersion medium so as to disintegrate the filter layer into the filter aid and to clean the filter aid (Step K3). The cleaning may be performed in the container in which the filter is set or may be performed in another container. In the case of using another container, the filter layer is disintegrated into the filter aid by cleaning or like processing and then is transferred. Water is used for the cleaning, and a surfactant or an organic solvent may be used for the cleaning.

Next, the filter aid after the cleaning is recovered by magnetic separation (Step K4). A method for the magnetic separation is not particularly limited, and examples thereof include a recovery method in which a permanent magnet or an electromagnet is put in a container, a method of recovering particles in which a metal mesh which is magnetized by a magnet is used capture the particles and the magnetic field is released to recover the particles, and the like.

In the second copper recovery method, since the filter aid forming the filter layer is contained in the treated water, i.e. the suspension prepared by using the treated water, the aggregates are continuously supplied together with the treated water (suspension) containing the copper compound to be removed.

Therefore, since the copper compound supply and the filter aid supply are simultaneously conducted even in the case where an amount of the copper compound in the treated water (suspension) is large, it is unlikely that clearances of the filter aid are filled with the excessively adsorbed copper compound as in the first embodiment. Therefore, a filtering rate is maintained for a long time. As a result, the copper recovery method of the second embodiment is effective for the case where a copper compound concentration in wastewater is high.

Further, in both of the first and second recovery methods, cleaning (desalination) of the copper compound to be recovered is easily performed. More specifically, ion components adhered to the copper compound are removed by supplying water to the filter aid and the copper compound deposited on the filter for a certain period of time.

In the second copper recovery method, the water containing copper to be treated is added to the precipitation tank in advance of adding alkali, and the alkali is added to cause the reaction to proceed. Here, a pH value in the tank is monitored and the addition of alkali is stopped so that the pH obtained is within the neutral range, resulting in generating copper oxide. It is believed that the copper oxide generation reaction proceeds according to the following formulas (1) and (2), and the copper hydroxide generation reaction proceeds according to the following formulas (3) and (4). The following formulas are examples in which copper oxide is precipitated by using hydrogen peroxide as an oxidizer, copper sulfate is precipitated as a copper component, and sulfuric acid is used as an acid component. The reaction formulas (1) and (2) indicate the copper oxide generation reaction (hereinafter referred to as Reaction 1) and the reaction formulas (3) and (4) indicate copper hydroxide generation reaction (hereinafter referred to as Reaction 2).

$$Cu_2 + H_2O_2 \rightarrow CuO \text{ (precipitated)} + H_2O \quad (1)$$

$$CuO + H_2SO_4 \rightarrow CuSO_4 \text{ (dissolved)} + H_2O \text{ (only in acid-environment)} \quad (2)$$

$$Cu^{2+} + 2NaOH \rightarrow Cu(OH)_2 \text{ (precipitated)} + 2Na^+ \quad (3)$$

$$CuO + H_2SO_4 \rightarrow H_2So_4 \text{ (dissolved)} + 2H_2O \text{ (only in acid-environment)} \quad (4)$$

In each of Reaction 1 and Reaction 2, in the acid-environment, the precipitate is not obtained since the product generated by the reaction reacts with acid and is dissolved. The precipitate emerges when the pH value is close to the neutral range. Here, in the case of giving priority to the copper oxide generation reaction rather than to the copper hydroxide generation reaction, it is better to keep the pH value close to the neutral range. More specifically, in the neutral range, Reaction 2 does not proceed due to the limited number of hydroxide groups, while only Reaction 1 proceeds due to the presence of hydrogen peroxide. The neutral range substantially means a range of pH 5 to 9.

Insofar as the ultimate pH value after the reaction terminates is maintained within the neutral range, the reaction may be continuously conducted by separately adding water to be treated which is acidic and a alkali solution (e.g. sodium hydroxide solution) to a liquid which is adjusted to the neutral range in advance of the addition, without limitation to the above-described method of adding alkali to the water to be treated.

The copper compound mainly containing copper oxide precipitated as describe above is recovered by using the filter aid in the same manner as in the first copper recovery apparatus.

As the copper oxide generation unit, both of a heating unit and a pH adjustment mechanism described in the third embodiment may be provided. More specifically, the heating unit (drum heater) may be provided in a precipitation tank provided with the pH adjustment mechanism. In this case, a copper oxide content is increased as compared to the case of having either one of the features.

Further, in each of the first and second recovery apparatuses, cleaning (desalination) of the copper compound to be recovered is easily performed. More specifically, the ion component attached to the copper compound is removed by supplying water to the filter aid and the copper compound deposited on the filter for a certain period of time.

Third Embodiment

A copper recovery apparatus 1B used for a precoating process will be described with reference to FIG. 6. Parts of the present embodiment which overlap with those of the foregoing embodiments are not repeated.
(Third Copper Recovery Apparatus)

In a copper recovery apparatus 1B of the present embodiment, a precipitation tank 2B is provided with a pH adjusting mechanism 23, 24, 25 in place of the drum heater 22 of the first embodiment. The pH adjusting mechanism 23, 24, 25 controls each of a flow rate of water to be treated and an injection amount of sodium hydroxide (NaOH) so as to adjust a pH value of the treated water to be sent from the precipitation tank 2B to a solid-liquid separation tank 3 to a desired range. More specifically, the pH adjusting mechanism is provided with a pH meter 23, a controller 24, and a NaOH injector 25.

The pH meter 23 is a monitoring sensor which measures a pH value of treated water in the precipitation tank 2B and sends a pH measurement signal to the controller 24.

The NaOH injector 25 injects a NaOH liquid which is an alkali agent into the precipitation tank upon reception of a control signal from the controller 24.

The controller 24 determines an alkali agent injection amount and a treated water introduction amount which do not cause the pH value of the treated water inside the precipitation tank to deviate from the neutral range (pH 5 to 9) based on the pH measurement signal inputted from the pH meter 23, a treated water flow rate measurement signal inputted from a flow rate sensor (not shown), and on a predetermined calculation formula and sends control signals to the NaOH injector 25 and a supply pump which is not shown (and/or a flow rate adjustment valve) provided in a line L1, respectively. The predetermined calculation formula is derived from the above-described reaction formulas (1) to (4) and other parameters (storage amount of treated water in precipitation tank, flow rate of water to be treated, initial pH value of water to be treated, temperature of treated water, etc.).

Hereinafter, more detailed description will be given by using various examples.

[Preparation of Filter Aids]

As the filter aid to be used for the above-described water treatment method, the following 6 types of filter aids A to F were prepared.

(Filter Aid A) Magnetite particles (average particle diameter: 2 μm)

(Filter Aid B) Magnetite particles (average particle diameter: 0.5 μm)

(Filter Aid C) Magnetite particles (average particle diameter: 5 μm)

(Filter Aid D) Filter aid prepared by a process described below:

A solution was obtained by dissolving 30 parts by weight of polymethylmethacrylate into 3 L of tetrahydrofuran, and 300 parts by weight of magnetite particles having an average particle diameter of 2 μm (A) was dispersed into the solution to obtain a composition. The composition was sprayed slowly by using a mini spray dryer (B-290 manufactured by Shibata Scientific Technology Ltd.) to prepare the filter aid having an average secondary particle diameter of about 11 μm (B), which was aggregated in the form of a sphere. An average coating thickness was 0.038 μm (C).

(Filter Aid E) Filter aid prepared by a process described below:

A solution was obtained by dissolving 30 parts by weight of polymethylmethacrylate into 3 L of tetrahydrofuran, and 300 parts by weight of magnetite particles having an average particle diameter of 2 μm (A) was dispersed into the solution to obtain a composition. The composition was sprayed slowly by using a mini spray dryer (B-290 manufactured by Shibata Scientific Technology Ltd.) to prepare the filter aid having an average secondary particle diameter of about 18 μm (B), which was aggregated in the form of a sphere. An average coating thickness was 0.038 μm (C).

(Filter Aid F) Filter Aid Prepared by a Process Described Below

A solution was obtained by dissolving 40 parts by weight of a resole type phenol resin into 3 L of water, and 300 parts by weight of magnetite particles (specific surface area: 2.5 m$^2$/g) having an average particle diameter of 2 μm (A) was dispersed into the solution to obtain a composition. The composition was sprayed slowly by using a mini spray dryer (B-290 manufactured by Shibata Scientific Technology Ltd.) to prepare the filter aid having an average secondary particle diameter of about 11 μm (B), which was aggregated in the form of a sphere. An average coating thickness calculated from the density of a polyphenol resin and the specific surface area of magnetite was 0.044 μm (C).

Example 1

In Example 1, the apparatus 1 of the first embodiment shown in FIG. 1 was used. As water to be treated, a copper sulfate solution containing 50 mg/L of copper was provided. The water to be treated was supplied to the precipitation tank 2, and 48% sodium hydroxide was added thereto by dropping to adjust a pH value of the treated water to pH 10. After mixing for a certain period of time, precipitation of light blue copper hydroxide was confirmed. The drum heater 22 was fed with electricity to raise a water temperature to 60° C., and mixing was performed at the temperature. After that, generation of copper oxide was confirmed since there was a blackened part. Further, a filter aid was supplied from the filter aid tank 5 charged with Filter Aid A to the mixing tank 6 and mixed with water so as to prepare a filter aid slurry. The filter aid slurry was supplied to the solid-liquid separator 3 to prepare a filter aid layer having an average thickness of 1 mm on the filter. After that, the treated water was supplied from the precipitation tank 2 to the solid-liquid separator 3 to perform filtering. Then, it was confirmed from the filtrated water that 99% or more of copper contained in the treated water was recovered. After the filtering, tap water was supplied from the upper line L10 of the solid-liquid separator 3 to remove ion components attached to the copper compound contained in the cake. Subsequently, cleaning water was supplied from a lateral direction of the filter 33 to disintegrate the layer formed on the filter, and the pieces were supplied to the separation tank 4. The stirrer 41 in the separation tank was operated to separate the filter aid from the copper compound, and the electromagnet 42 was operated to capture only the filter aid, followed by discharging discharged water. The discharged water was analyzed to confirm that main components of the slurry were copper hydroxide and copper oxide. After that, a magnetic field of the magnet was released, and cleaning water was supplied to obtain a filter aid slurry. Then, the filter aid slurry was returned to the filter aid tank 5. After that, the same operation as described above was conducted by supplying the filter aid slurry to mixing tank 6, and reuse thereof was achieved without any problem.

Example 2

In Example 2, the apparatus same as that used in Example 1 was used, and an experiment was conducted in the same manner as in Example 1 except for using Filter Aid B in place of Filter Aid A. The copper recovery rate was 99% or more. A water passing rate in the solid-liquid separator was a half of that of Example 1, and no problem occurred in the operation.

Example 3

In Example 3, the apparatus same as that used in Example 1 was used, and an experiment was conducted in the same manner as in Example 1 except for using Filter Aid C in place of Filter Aid A. The copper recovery rate was 99% or more. A water passing rate in the solid-liquid separator was about a double of that of Example 1, and no problem occurred in the operation.

Comparative Example 1

In Comparative Example 1, the apparatus same as that used in Example 1 was used, and an experiment was conducted in the same manner as in Example 1 except for using magnetite particles having an average particle diameter of 0.3 μm in place of Filter Aid A. Filtering was conducted, but the filter was clogged to fail to attain a satisfactory filtering flow rate.

Example 4

In Example 4, the apparatus 1A of which the outline is shown in FIG. 4 was used. Copper-containing water to be treated was supplied to the precipitation tank 2A, and a sodium hydroxide solution was added thereto to alkalize the solution and to precipitate copper hydroxide. The precipitation and mixing tank 2A was provided with the drum heater 22, so that a temperature of the precipitation tank was controlled to 60° C. Further, a filter aid was directly supplied from the filter aid tank 5 to the precipitation and mixing tank 2A to prepare a mixed slurry of the copper precipitate and the filter aid. The filter aid slurry was sent to the solid-liquid separator 3, so that a film of the filter aid is formed on the filter, and the copper compound was removed. The filtrate was a weakly alkaline treated liquid from which copper was removed and may be discharged through a neutralization tank and, alternatively, is usable as cleaning water for the solid-liquid separator 3 or the magnet of the separation tank 4 or a liquid for preparing the filter slurry in the filter aid tank 5. After termination of the filtering of the treated water, the filter aid and a cake of the precipitated copper compound were present on the filter 33 inside the solid-liquid separator 3. Tap water was supplied from the upper line L10 of the solid-liquid separator 3 to remove ion components attached to the copper compound contained in the cake. After the ion removal, cleaning water was supplied from a lateral side of the filter 33 to disintegrate the cake, and the pieces were supplied to the separation tank 4. The separation tank 4 was provided with the stirring screw 41 and the electromagnet (magnetic separation mechanism), so that the filter aid and the copper compound were separated from each other while being mixed, and only the filter aid was captured by the magnet and recovered. The liquid from which the filter aid was recovered contained the copper compound at a high concentration and discharged. The filter aid recovered is cleaned with supplied cleaning water to be returned to the filter aid tank 5. The filter aid returned to the filter aid tank 5 was supplied again to the precipitation and mixing tank 2A to be reused.

As the water to be treated, a copper sulfate solution containing 1000 mg/L of copper was provided. The water to be treated was supplied to the precipitation tank 2A, and 48% sodium hydroxide was added thereto by dropping to adjust a pH value of the treated water to pH 10. After mixing for a certain period of time, precipitation of light blue copper hydroxide was confirmed. The drum heater 17 was operated to raise a water temperature to 60° C., and mixing was performed at the temperature. After that, blackened part was observed, resulting in confirmation of the generation of copper oxide.

Further, the filter aid was supplied from the filter aid tank 5 charged with Filter Aid A to precipitation tank such a manner the filter-aid concentration of 10000 mg/L was obtained, and a slurry of the filter aid and a copper precipitate was prepared The filter aid slurry was supplied to the solid-liquid separator 3 to perform filtering on the filter 33, and then it was confirmed from the filtrated water that 99% or more of copper contained in the treated water was recovered. After the filtering, tap water was supplied from the upper line L10 of the solid-liquid separator 3 for one minute to remove ion components contained in the cake. Subsequently, cleaning water was supplied from a lateral direction of the filter 33 to disintegrate the layer formed on the filter 33, and the pieces were supplied to the separation tank 4. The stirrer in the separation tank 4 was operated to separate the filter aid from the copper compound, and the electromagnet 42 was operated to capture only the filter aid, followed by discharging discharged water. The discharged water was analyzed to confirm that main components of the slurry were copper hydroxide and copper oxide. After that, a magnetic field of the electromagnet 42 was released, and cleaning water was supplied to obtain a filter aid slurry. Then, the filter aid slurry was returned to the filter aid tank 5. After that, the same operation as described above was conducted by supplying the filter aid slurry to the precipitation and mixing tank 2A, and reuse thereof was achieved without any problem.

Example 5

In Example 5, the apparatus same as that used in Example 4 was used, and an experiment was conducted in the same manner as in Example 4 except for using Filter Aid D in place of Filter Aid A. The copper recovery rate was 99% or more. A water passing rate in the solid-liquid separator was 1.3 times of that of Example 4, and no problem occurred in the operation.

Example 6

In Example 6, the apparatus same as that used in Example 4 was used, and an experiment was conducted in the same manner as in Example 4 except for using Filter Aid E in place of Filter Aid A. The copper recovery rate was 99% or more. A water passing rate in the solid-liquid separator was about a double of that of Example 4, and no problem occurred in the operation.

Example 7

In Example 7, the apparatus same as that used in Example 4 was used, and an experiment was conducted in the same manner as in Example 4 except for using Filter Aid F in place of Filter Aid A. The copper recovery rate was 99% or more. A water passing rate in the solid-liquid separator was about 1.2 times of that of Example 4, and no problem occurred in the operation.

Example 8

In Example 8, the apparatus 1B of which outline is shown in FIG. 6 was used. The apparatus 1B was different from the apparatus 1 of FIG. 1 by the feature that the pH adjustment mechanism 23 to 25 was provided in place of the drum heater 22 to control a flow rate of water to be treated and an injection amount of NaOH, thereby adjusting a pH value of the treated water in the precipitation tank 2B.

As the water to be treated, a copper sulfate solution containing 50 mg/L of copper was provided. The treated water was supplied to the precipitation tank 2B, and then 48% sodium hydroxide was added thereto by dropping. Subsequently, a precipitate was begun to be observed when a pH value reached to about pH 5. After that, the pH value was adjusted to pH 8, followed by 20 minutes of stirring, whereby a color of the treated water turned to be deep green to ensure generation of a mixture of copper hydroxide and copper oxide.

Further, a filter aid was supplied from the filter aid tank 5 charged with Filter Aid F to the mixing tank 6 and mixed with water to prepare a filter aid slurry. The filter aid slurry was supplied to the solid-liquid separator 3 to prepare a filter aid layer having an average thickness of 1 mm on the filter 33. After that, the treated water was supplied from the precipitation tank 2B to the solid-liquid separator 3 to perform filtering. Then, it was confirmed from the filtrated water that 99% or more of copper contained in the treated water was recovered. After the filtering, tap water was supplied from the upper line of the solid-liquid separator 3 for one minute to remove ion components contained in the cake. Subsequently, cleaning water was supplied from a lateral direction of the filter 33 to disintegrate the layer formed on the filter, and the pieces were supplied to the separation tank 4. The stirrer 41 in the separation tank was operated to separate the filter aid from the copper compound, and the magnet 42 was operated to capture only the filter aid, followed by discharging discharged water. The discharged water was analyzed to confirm that main components of the slurry were copper hydroxide and copper oxide. After that, a magnetic field of the magnet was released, and cleaning water was supplied to obtain a filter aid slurry. Then, the filter aid slurry was returned to the filter aid tank 5. After that, the same operation as described above was conducted by supplying the filter aid slurry to mixing tank 6, and reuse thereof was achieved without any problem.

Example 9

In Example 9, the apparatus same as that used in Example 8 was used, and an experiment was conducted in the same manner as in Example 8 except for conducting an experiment by continuously withdrawing the treated water from the precipitation tank 2B. More specifically, after once adjusting a pH value of treated water in the precipitation tank to pH 8, the treated water and NaOH were continuously added in such a manner as to maintain the pH value within the range of pH 5 to 9, and the treated water was continuously supplied from the precipitation tank to the solid-liquid separator in which a layer of a filter aid was formed in advance of the continuous water supply. After that, a treatment was performed in the same manner as in Example 8. It was confirmed from the filtrated water that 99% or more of copper contained in the treated water was recovered, and reuse of the filter aid was attained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A copper recovery apparatus comprising:
   a mixing and precipitation tank configured to receive water comprising copper ions, an alkali and a filter aid comprising magnetic particles having an average particle diameter of 0.5 to 20 μm to prepare an alkaline suspension containing a precipitate of copper compound;
   a heater configured to heat the suspension in the mixing and precipitation tank to convert at least a part of the copper compound in the suspension into copper oxide;
   a filter-aid feeder configured to supply the filter aid to the mixing and precipitation tank;
   a solid-liquid separator comprising a filter, the solid-liquid separator being configured to receive the suspension from the mixing and precipitation tank to subject the suspension to a filtration by the filter so that the precipitate and the filter aid which is retained on the filter is separated from a filtrate;
   a cleaning-water supply line configured to supply water to the filter having the precipitate and the filter aid retained thereon to remove the precipitate and the filter aid from the filter;
   a cleaning-water discharge line configured to discharge from the solid-liquid separator the precipitate and the filter aid together with the water supplied by the cleaning water supply line to the filter;
   a separation tank configured to receive the precipitate, the filter aid and the water discharged from the solid-liquid separator and separate the filter aid from the precipitate and the water by utilizing a magnetic field; and
   a filter-aid return line configured to return the filter aid separated in the separation tank to the filter-aid feeder.

2. The copper recovery apparatus of claim 1, wherein
   the filter aid comprises an aggregate which is obtainable by aggregating magnetic particles of which each surface is coated with a polymer;
   the magnetic particles have an average particle diameter D1 which is within a range of 0.5 to 20 μm;
   the aggregate has an average aggregate diameter D2 which together with D1 satisfies the relationship: D1<D2≤20 μm; and
   the polymer has an average coating thickness t ranging 0.01≤t≤0.25 μm.

3. The copper recovery apparatus of claim 2, wherein the polymer is selected from the group consisting of polyacrylonitrile, polymethylmethacrylate and polystyrene, copolymer thereof, phenol resin, and a trialkoxysilane condensate.

4. The copper recovery apparatus of claim 1, wherein the magnetic particles comprise iron.

5. The copper recovery apparatus of claim 4, wherein the magnetic particles comprise a component selected from the group consisting of magnetite, ilmenite, pyrrhotite, magnesia ferrite, cobalt ferrite, nickel ferrite, and balium ferrite.

6. The copper recovery apparatus of claim 4, wherein the magnetic particles comprise magnetite.

7. The copper recovery apparatus of claim 1, further comprising:
   an alkali feeder configured to add the alkali to the mixing and precipitation tank;
   a pH meter configured to measure a pH value of the treated water in the mixing and precipitation tank; and an alkali-feed controller configured to control the amount of the alkali added from the alkali feeder to the mixing and precipitation tank so that the pH value of the treated water in the mixing and precipitation tank is neutral, based on the pH value measured by the pH meter.

* * * * *